US012200850B2

(12) United States Patent
Van Brussel

(10) Patent No.: US 12,200,850 B2
(45) Date of Patent: Jan. 14, 2025

(54) ACTIVE RISE AND FALL TIME COMPENSATION ALGORITHM

(71) Applicant: KONINKLIJKE PHILIPS N.V., Eindhoven (NL)

(72) Inventor: Jeroen Van Brussel, Noord-Brabant (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 18/244,995

(22) Filed: Sep. 12, 2023

(65) Prior Publication Data

US 2024/0008161 A1 Jan. 4, 2024

Related U.S. Application Data

(63) Continuation of application No. 17/601,098, filed as application No. PCT/EP2020/059677 on Apr. 3, 2020, now Pat. No. 11,792,907.

(30) Foreign Application Priority Data

Apr. 4, 2019 (EP) .................................... 19167357

(51) Int. Cl.
*H05G 1/32* (2006.01)
*H05G 1/04* (2006.01)
*H05G 1/22* (2006.01)
*H05G 1/26* (2006.01)
*H05G 1/36* (2006.01)

(52) U.S. Cl.
CPC ................. *H05G 1/32* (2013.01); *H05G 1/04* (2013.01); *H05G 1/22* (2013.01); *H05G 1/265* (2013.01); *H05G 1/36* (2013.01)

(58) Field of Classification Search
CPC ............ H05G 1/04; H05G 1/36; H05G 1/265; H05G 1/32; H05G 1/22; H05G 1/12; H05G 1/20; H05G 1/54; H05G 1/46; H05G 1/56; H05G 1/34; H05G 1/58; H05G 1/26; H05G 1/38; G01V 5/10; G01V 5/12; G05F 1/46; H02M 7/103; H02M 7/5387; G21G 4/02
USPC .......................................................... 378/112
See application file for complete search history.

(56) References Cited

U.S. PATENT DOCUMENTS

| | | | |
|---|---|---|---|
| 4,454,606 | A | 6/1984 | Relihan |
| 7,221,735 | B2 | 5/2007 | Inoue |
| 7,233,645 | B2 | 6/2007 | Feda |
| 2005/0134370 | A1 | 6/2005 | Kelly |
| 2006/0098778 | A1 | 5/2006 | Oettinger et al. |
| 2010/0027750 | A1 | 2/2010 | Schulze-Ganzlin |

(Continued)

OTHER PUBLICATIONS

International Search Report of PCT/EP2020/059677, dated Jun. 26, 2020.

*Primary Examiner* — Irakli Kiknadze

(57) ABSTRACT

A method is provided for compensating the settings of a pulsed X-ray system. A current, voltage and intended pulse width settings are selected for the X-ray pulses to be provided. Then, the selected pulse width setting for the set voltage and tube current is compensated, in accordance with stored normalized value or values at a predetermined temperature, taking into account the environmental temperature of the electric circuitry of the X-ray tank. The normalized values are obtained in a calibration step from the actual or effective pulse width and the difference thereof with the intended width, normalizing said value with the temperature of the circuitry providing pulsed voltage and current to the source.

20 Claims, 4 Drawing Sheets

(56) References Cited

U.S. PATENT DOCUMENTS

| | | | |
|---|---|---|---|
| 2011/0002446 | A1 | 1/2011 | Beland |
| 2018/0239052 | A1 | 8/2018 | Teague |

ACTIVE RISE AND FALL TIME COMPENSATION ALGORITHM

CROSS-REFERENCE TO RELATED APPLICATIONS

This application is a continuation application of U.S. application Ser. No. 17/601,098, filed on Oct. 4, 2021, which is a U.S. National Phase application under 35 U.S.C. § 371 of International Application No. PCT/EP2020/059677, filed Apr. 3, 2020, which claims the benefit of European Patent Application No. 19167357.3, filed on Apr. 4, 2019. These applications are hereby incorporated by reference herein.

FIELD OF THE INVENTION

The invention relates to the field of radiation diagnosis. More specifically it relates to method of generating X-ray pulses, activating and calibrating an X-ray system, software products and systems and to related calibrated X-ray systems.

BACKGROUND OF THE INVENTION

In an X-ray machine, several different X-ray patterns can be generated. Depending on the application, the surgeon, the type of surgery, and/or the components used in the X-ray machine, some X-ray patterns have benefits over others. One of the possible X-ray patterns is a pulsed pattern, in which X-rays are generated with a predetermined duty cycle.

As per international regulations, the applied X-ray parameters shall be reported to the user, within defined accuracies. Specifically, for many applications (including medical and surgery applications) the intended average tube current shall be accurate within 20% of the current actually applied to the tube, for any setting selectable by the user. For a continuous X-ray mode, the average tube current is only depending on the amount of tube current. For pulsed X-ray mode, however, the average current is a combination of the peak tube current and the pulse width as function of the period time in which this peak tube current is actually applied (duty cycle).

Due to wiring and circuitry, when a voltage setting (e.g. a square wave) pulse is applied to energize an X-ray tube anode, the cable and circuitry capacity results in an increased rise time of the pulse. On the other hand, when the voltage is removed at the end of the pulse to terminate the x-ray exposure, discharge of the cable and circuitry capacitive current results in the applied kilovoltage decaying with some delay, instead of falling instantaneously.

The retarded rise time and extended decay time cause an error in the order of one or a few percentages in the exposure interval when the interval is long, such as well over 20 milliseconds (ms). However, for short duration x-ray exposures, such as below 20 ms, the rise and decay times represent a substantial percentage of the exposure interval.

U.S. Pat. No. 4,454,606A provides an automatic exposure control for compensating the rise and decay times. However, the compensation cannot take into account changes in the X-ray generator due to e.g. use, and often a time consuming recalibration of the device is required to compensate for such changes.

Moreover, these inaccuracies are more difficult to predict, and settings of the X-ray system outside of a range of optimal setting values may require compensation in order to achieve improved accuracies.

SUMMARY OF THE INVENTION

It is an object of embodiments of the present invention to provide a method of activating an X-ray system, a method of calibrating an X-ray system, software-implemented methods of calibrating and/or activating an X-ray system, and an X-ray system where the pulses are normalized and compensated for temperature variations in the electronic circuitry of the X-ray source, e.g. in the oil surrounding the X-ray tube.

In a first aspect the invention provides a method of providing or generating X-ray pulses, by means of an X-ray system comprising an X-ray tank including an X-ray source or tube, the method including:

- selecting current, voltage and intended pulse width settings for the X-ray pulses to be provided,
- compensating the selected pulse width setting for the set voltage and tube current, in accordance with a stored normalized value at a predetermined temperature, taking into account the internal temperature of the X-ray tank.

The X-ray system may comprise an X-ray generator, and the compensation may be done by introducing the compensated X-ray pulse width in the X-ray generator.

It is an advantage of embodiments of the present invention that the deviation of the pulse width, caused by the influence of the temperature on the electronics of the system, specifically of the X-ray tank, can be compensated by use of a prediction model taking into account temperature. Pulse width correction improves dosage of X-ray, as well as average current accuracy through the X-ray tube, which allows meeting international standards more easily, and allows further reduction of minimal usable pulse widths.

In other words, for the selected (intended) pulse width, an actual pulse width value to be used for example in generating X-ray pulses using an X-ray system may be derived from a corresponding one of the stored normalized values, for example a normalized value determined for a tube voltage and current matching present settings for the tube voltage and current. In this context, the "normalized value" is understood as a deviation or delta value between an intended X-ray pulse width and an actual X-ray pulse width, normalized to a predetermined temperature. While the normalized value is determined at a predetermined temperature (or reference temperature), a current temperature, in particular the internal temperature of the X-ray tank, may be taken into account in determining any required compensation for an actual X-ray pulse width to be set. For example, a predetermined temperature dependency of the pulse width deviation may be involved as described further herein.

In some embodiments of the present invention, the method further comprises calculating, by interpolation, a normalized value from a stored normalized value corresponding to a first setting for a current and first setting for a voltage, and a stored further normalized value corresponding to a further setting for a current and a further setting for a voltage, at least one of the further settings being different from the first settings values, where the selected current and voltage values are between the at least one different first and further settings of current and/or first and further settings of voltage.

It is an advantage of embodiments of the present invention that settings of voltage and/or current not used during calibration can still be compensated by obtaining the normalized values using interpolation of values stored runtime, hence allowing storing a small amount of values, e.g. allowing using a small LUT.

In a second aspect the invention provides a method of calibrating an X-ray system including an X-ray tank where the X-ray tank comprises an X-ray source, the method comprising:

applying settings for a selected current, a selected voltage and an intended pulse width to the X-ray source, thus generating an actual voltage and current signal for the X-ray source to produce at least one X-ray pulse, the thus produced at least one X-ray pulse having an actual pulse width, measuring the actual voltage signal applied to the X-ray source and determining the actual pulse width based on the measured actual voltage signal, obtaining a difference between the actual pulse width and the intended pulse width, normalizing this difference obtained at an actual internal temperature of the X-ray tank to a normalized difference for a predefined internal temperature of the X-ray tank, said internal temperature being the environmental temperature for the electronic circuitry (e.g. including capacitors) thus obtaining a normalized value from this difference at a predefined temperature, taking into account the internal temperature of the X-ray tank as an environmental temperature to e.g. capacitors, and storing said normalized value from said difference as a function of the setting of selected current and selected voltage.

For example, the X-ray system may include an X-ray generator, and applying the settings may include applying said settings in the X-ray generator.

The stored normalized value can be used in methods of the first aspect of the present invention. It is an advantage of embodiments of the present invention a prediction model can be provided for compensating deviations of the pulse width caused by the temperature for all required voltage (kV) and tube current settings of the high voltage power supply X-ray system, e.g. an X-ray tank including an X-ray source. The normalized values are preferably stored in a LUT. The actual pulse width can be determined as the time interval between the moment at which the actual voltage signal surpasses a predetermined threshold and the moment at which the actual voltage signal drops under that predetermined threshold.

In some embodiments of the present invention, the method further comprises measuring an internal temperature of the X-ray tank (being the environmental temperature for the electronic circuitry of the X-ray tank) before obtaining a normalized value from said difference.

It is an advantage of embodiments of the present invention that variations of the temperature can be obtained for different settings with a simple temperature sensor, which can be normalized to the predetermined temperature by predetermined relationships between temperature and the change of electric characteristics of circuitry in the tank.

In some embodiments of the present invention, the method further comprises obtaining a rise and fall time deviation of the at least one X-ray pulse from the difference between the determined actual pulse width and the intended pulse width. Obtaining normalized values from said difference at a predefined temperature further comprises obtaining normalized values of the rise and fall time deviation at the predefined temperature, by using a predetermined relationship between capacitance variation of the X-ray tank and the internal tank temperature.

It is an advantage of embodiments of the present invention that any reproducible rise and fall time deviation can be compensated for, by calculating the variation of electric characteristics as a function of internal temperature of the X-ray tank and circuitry therein (e.g. high voltage converter, wiring, etc.), allowing an improved accuracy in average current applied to the X-ray source. It is a further advantage that international regulatory requirements of current accuracy can be more easily met. It is a further advantage that the use of smaller pulse widths is enabled with high accuracy.

In some embodiments of the present invention, storing the normalized values from the difference between the actual pulse width and the intended pulse width comprises storing the normalized values of the rise and fall time deviation as a function of the selected current and selected voltage.

It is an advantage of embodiments of the present invention that the normalized values of rise and fall deviation can be stored with no need of storing pulse widths or differences thereof.

In some embodiments of the present invention, the method is repeated for at least a different selected setting of current and/or voltage, thereby storing a further normalized value from said difference as a function of the different selected current and selected voltage.

It is an advantage of embodiments of the present invention that a list of values can be obtained for building a predictive model.

In particular embodiments, the method comprises calculating, by interpolation, at least one normalized value from a current and/or voltage between a selected setting of current and/or voltage and a different selected setting of current and/or voltage.

It is an advantage of embodiments of the present invention that settings of voltage and/or current not used during calibration can still be compensated by obtaining the normalized values using interpolation of values stored during calibration, with no need to provide calculations runtime, hence saving processing time during utilization of the X-ray system.

In a third aspect the present invention provides a software product or program, including instructions for controlling an X-ray system, for providing X-ray pulses in accordance with the method of the first aspect of the present invention, further adapted for receiving a required pulse width setting, further adapted for receiving normalized values obtained by the method of the second aspect of the present invention.

The software product or program may include data storage.

It is an advantage of embodiments of the present invention that software can be provided, for example in a control unit for an X-ray system, and/or in the X-ray generator of the X-ray system, which can improve the performance of the system. It enables the use of pulses with smaller widths, by increasing the accuracy of pulse widths in a range of settings wider than the optimal range of the X-ray system alone, thus increasing usable range of voltage, current settings and allowed pulse widths. It is a further advantage that the X-ray system can provide X-ray generation with lower power, which in turn increases the useful life of X-ray sources. It is a further advantage that international regulatory requirements of accuracy can be easily met.

In embodiments of a fourth aspect of the present invention, the software product is adapted for calibrating the pulse width of X-ray pulses provided by an X-ray system, the software product adapted for receiving pulse width measurements, optionally also for receiving temperature measurements. The software product is adapted (e.g. includes instructions) for executing the calibration method of the second aspect of the present invention when implemented in an X-ray system.

It is an advantage of embodiments of the present invention that a software product, e.g. included in a control unit for an X-ray system, can be provided, which can build a prediction model for compensating deviations of the pulse width caused by the temperature of that X-ray system (or X-ray tank thereof).

In a fifth aspect the present invention provides a data storage for an X-ray system including normalized values obtained by the method of the second aspect of the present invention. It is an advantage of embodiments of the present invention that a data storage can be used for calibrating different X-ray systems comprising electronic circuitry in the X-ray tank with similar or the same behavior with temperature. The data storage may be included in a control unit, or in the software product of the third aspect.

In a sixth aspect the present invention provides an X-ray system. The X-ray system includes an X-ray tank, which includes an X-ray tube, and further comprising a control unit (for example integrated in an X-ray generator unit included in the X-ray system) being controllable by the software product of the third aspect of the present invention. It may also include a data storage in the software product of the third aspect or the fifth aspect of the present invention.

In some embodiments of the present invention, the X-ray system further comprises a temperature sensor, for sensing the temperature of at least part of the X-ray tank, e.g. the internal temperature, e.g. the environmental temperature of the circuitry in the tank, e.g. the temperature of the fluid surrounding said circuitry.

In some embodiments of the present invention, the X-ray system further comprises the data storage of the fifth aspect, optionally being a reprogrammable data storage. In this case, for example, the control unit is configured to receive at least one of the normalized values from the data storage.

It is an advantage of embodiments of the present invention that the X-ray system includes previously obtained normalized values for correcting the pulse width, and optionally can calibrate itself and update the normalized values for compensation of the pulse width if required.

A modular device can be provided comprising the X-ray system of the present invention, the modular device being adapted for mobile surgery applications. It is an advantage of embodiments of the present invention that an X-ray system can be obtained with a large range of usable pulse widths and highly accurate and effective pulses, even at low pulse energy, further allowing reducing the peak energy used, so the device can use more compact power supplies while achieving the same average power, e.g. with no reduction of average power.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
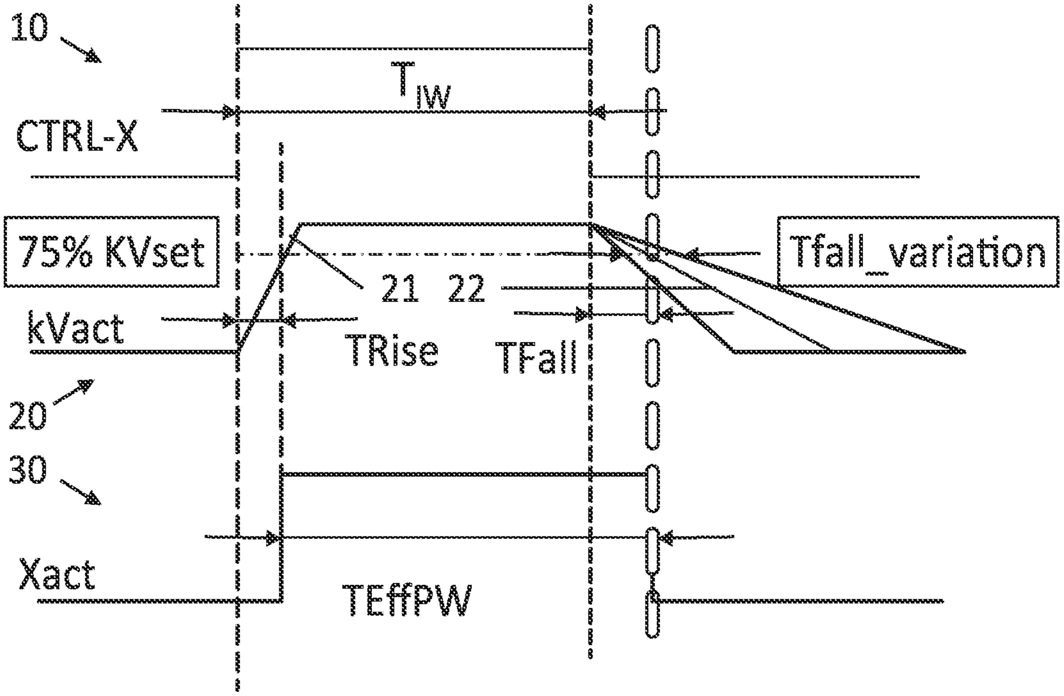
FIG. 1 illustrates an X-ray pulse with an intended shape, the actual voltage which generates the charge beam for generating the photons forming the X-ray pulse, and the actual shape of the generated X-ray pulse.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF THE EMBODIMENTS

The present invention will be described with respect to particular embodiments and with reference to certain drawings but the invention is not limited thereto but only by the claims. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term “comprising”, used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. The term “comprising” therefore covers the situation where only the stated features are present and the situation where these features and one or more other features are present. Thus, the scope of the expression “a device comprising means A and B” should not be interpreted as being limited to devices consisting only of components A and B. It means that with respect to the present invention, the only relevant components of the device are A and B.

Reference throughout this specification to “one embodiment” or “an embodiment” means that a particular feature, structure or characteristic described in connection with the embodiment is included in at least one embodiment of the present invention. Thus, appearances of the phrases “in one embodiment” or “in an embodiment” in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

X-ray systems, including systems for medical applications, usually include an X-ray generator and an X-ray tank, which include an X-rays source. X-ray sources, also known in the technical field as X-ray tubes, usually produce X-ray photons of high energy, generated by the interaction of an electron beam from a cathode with a target anode.

The electron beam is usually provided by applying a voltage between cathode and anode. In pulsed mode, the voltage is applied as pulses, where a predetermined voltage is applied intermittently. Specifically, a constant voltage is applied for an interval of time for the duration of the pulse, and between the pulses, the voltage is not high enough to produce X-ray emission; ideally no voltage (or zero voltage) is applied. The specific pulse parameters, with a desired or intended pulse width, is chosen in accordance with application requisites, for example the type of procedure, the zone to be irradiated, patient body mass, etc.

The intended pulse may be an ideal pulsed wave, e.g. a square wave, where the voltage reaches the predetermined value instantly and drops also instantly. However, in real conditions, a perfect pulse wave is not obtained by simply applying the suitable settings on an X-ray system or X-ray generator thereof. The voltage actually applied to the source takes a time to reach its intended value and to reach the lowest value after the pulse is turned off. As a result, an effective or actual pulse width may be smaller than the intended pulse width.

FIG. 1 shows a top graph 10 with an intended X-ray pulse CTRL-X. The intended shape is determined by current, voltage and width settings with the intended pulse width, $T_{IW}$. Said settings are applied to the system, e.g. by introducing the settings in an X-ray generator.

The middle graph 20 shows the change of the actual voltage (kVact) through the source or tube with time, which generates the charge beam (typically electron beam) for generating the photons forming the X-ray pulse. The actual voltage kVact includes rise and fall edges 21, 22. These edges occur due to circuit electronics, parasitic capacitance and resistance and the like, mainly from the circuitry which powers the source. While the voltage is increasing or decreasing, not all the emitted photons can be considered effective. The actual parameters, notably the width, of the generated X-ray have to be calculated taking these edges into account. Per definition, an X-ray is considered as effective X-ray when the voltage is equal or larger than a predetermined percentage of the set voltage. In other words, the effective width of the actual pulse (or actual pulse width, for short) is measured from the moment the voltage rises over a predetermined threshold (usually 75% of the peak value) until the moment the voltage drops under the same threshold.

The actual, effective, X-ray pulse Xact is shown in bottom graph 30 of FIG. 1. Due to the rising edge 21, Xact starts after the control signal for the intended X-ray pulse CTRL-X has been introduced, and it is only considered an effective X-ray when the actual voltage kVact surpasses the threshold of 75% of the voltage set kVset, after a “rise time ($T_{RISE}$)” has passed. Analogously, due to the falling edge 22, the pulse Xact is considered as turned off only after a “fall time ($T_{FALL}$)” passed after CTRL-X is switched off, specifically when the actual voltage kVact drops under the threshold of 75% of the voltage set kVset. The actual pulse width $T_{EffPW}$ is measured from the moment Xact starts and Xact finishes. Thus, the actual X-ray pulse and specifically its width $T_{EffPW}$ is subject of the rise time ($T_{RISE}$) and fall time ($T_{FALL}$) of the voltage. Notably, compensating the fall time is difficult because it is a priori not known how long it will take the voltage to drop under the threshold, and it is subject to variations as shown in FIG. 1.

Moreover, the inaccuracy increases when using very short pulse widths, e.g. of the order of milliseconds, because in this situation the relative influence of fixed amount of rising and falling time is largest compared to the actual X-ray pulse at the intended settings. For very low voltage (kV) and current (mA) conditions, the inaccuracies increase. It is believed that this is due to the fact that the speed of the high voltage power supply and its circuitry is reduced. In particular, it is due to the discharge exponential curve of the capacitance. At a higher voltage the initial part of the discharging phase of the capacitor is faster than at a lower voltage. For example, from 100% to 75% at 100 kV is 100 kV to 75 kV, whereas for 40 kV it goes from 40 kV to 30 kV, hence the speed of discharge is different.

Further, it has been observed that temperature fluctuations of the X-ray tank cause an increase of inaccuracy. Without wishing to be bound by theory, this increase is believed to be caused by a change in impedance (e.g. capacitance) parameters, due to change of temperature, of the circuitry which provides pulsed voltage and current to the source, usually present in the tank.

The present invention provides a predictive model which allows compensation of the rise and fall time, even for very short pulses, low voltages and currents, and in some embodiments for different temperatures. In particular, the present invention allows correcting the settings of the X-ray generator for the pulse width, as function of the voltage and current, before the X-ray pulse is even generated, taking into account the temperature of the electronic circuitry, e.g. for variations of temperature. In some embodiments, the predictive model is able to predict the behavior of rise and fall times obtained from variation of the electric characteristics of the circuitry in the X-ray generator with the temperature.

Figure 2:
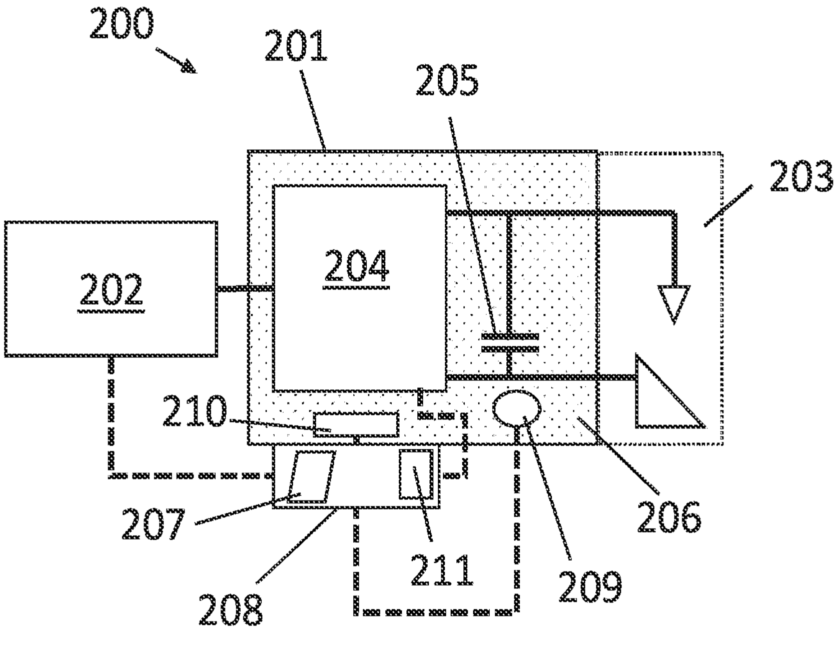
FIG. 2 shows schematically an X-ray system in accordance with some embodiments of the present invention.

In a first aspect, the present invention provides a method of generating or providing X-ray pulses with a pre-calibrated X-ray system. FIG. 2 shows schematically such an X-ray system 200 in accordance with some embodiments of the present invention, including an X-ray tank 201 and an X-ray generator 202. The tank 201 includes an X-ray source 203 and circuitry 204, 205 (including transformers, capacitors, etc.) surrounded by fluid 206 (e.g. cooling fluid). At least one normalized value, for correcting the pulse width, is stored in a data storage 207, such as a memory, a software database, a Look-up table (LUT), a matrix formula or the like.

The normalized value is the value of a deviation between the intended pulse width for a specific tube current and voltage (kV) setting and the effective or actual pulse width, at a predetermined temperature or reference temperature. In the context of the present application, these deviation values are referred to as "normalized" with respect to a predetermined temperature or reference temperature. In determining the normalized values, the temperature may be controlled or it may be measured.

By applying a compensation to an actual pulse width in accordance with the normalized values, the expected variation, or correction factor, of electric characteristics with temperature may be taken into account. The electric characteristics may include impedance, e.g. capacitance, of circuitry, which have an expected or known variation dependent on temperature. During calibration, the normalized values may be calculated from the measurement of the difference of actual and intended pulse width and then stored. Alternatively or in addition, normalized values may be interpolated from previously stored normalized values, for example when for a certain combination of tube current and voltage no matching stored normalized value is available.

Figure 3:
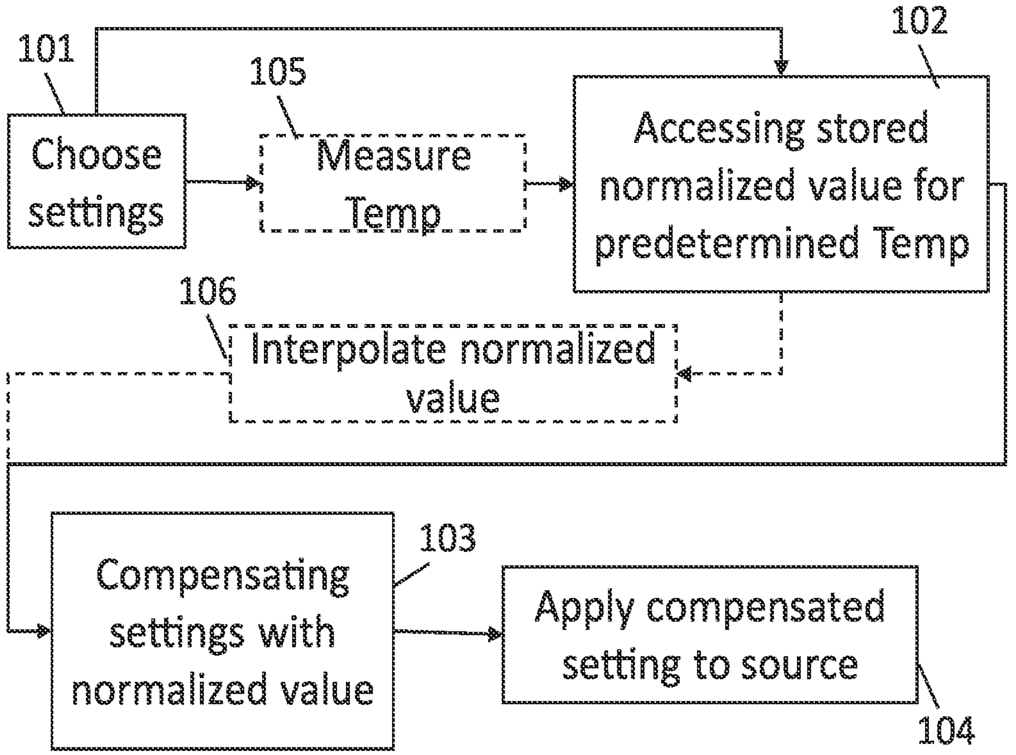
FIG. 3 shows a method of generating pulsed X-ray including compensating the selected settings for X-ray generation.

A process flow for generating X-rays with an X-ray system, including the service procedure, is shown in FIG. 3. First, the voltage, current and pulse width settings are chosen 101. For example, an intended pulse (CTRL-X) with an intended width $T_{IW}$ is chosen and introduced in the X-ray generator 202. These settings may be defined in a database used for examination settings, together with voltage and current settings for the X-ray source. These settings typically depend on the type of examination, the thickness of the patient or the part of the patient's body under study, the structures in the image area, and the like, and they are usually predefined in a database. For example, the user can select a type of application (veterinary, human, part of the body to be irradiated, skeletal or vascular settings, etc.) and/or radiation dosage, or the like. The actual pulse settings for voltage, current and pulse width are internally applied by the system based on the selection by the user.

The method comprises accessing 102 at least a stored value related to the pulse width, normalized to a predetermined temperature (the stored value being referred to as "normalized value", for short).

The normalized values had been obtained during calibration with selected settings of voltage, current and pulse width, and it is linked to the values of those settings of voltage and current. The normalized value can be obtained during a previous calibration procedure done by the manufacturer, for example as part of the manufacture of the system, or by a service engineer, or by the end user once the system is provided to the user. The obtained normalized values are stored in the data storage 207 as a reference, for accessing during the method of generating X-rays. The calibration is explained with more detail with reference to embodiments of the second aspect of the present invention.

The normalized value or values to correct the pulse width can be obtained for one or more current and/or voltage settings. When the current and voltage settings chosen for generating X-rays coincide with the settings of current and voltage at which one normalized value has been stored in the data storage 207, that normalized value is chosen.

In some embodiments, when the current and voltage settings chosen for generating X-rays do not coincide with any of the values of current and voltage settings stored in the data storage, the normalized value is interpolated 106. Thus, the normalized value for the chosen settings is calculated by interpolating the normalized values for the closest higher setting and the closest lower setting. For example, a chosen voltage and current setting may not correspond to any value used for obtaining a normalized value. In this case, two normalized values are chosen, namely the values corresponding to the voltage settings between which the chosen voltage setting falls, and the closest current setting. The normalized value for the chosen current and voltage setting is calculated by interpolating the two chosen normalized values of the voltage setting. An analogous procedure would apply if it would be necessary interpolation of normalized values based on the closest higher and lower current settings, or a combination of both voltage and current setting. In some embodiments, a voltage/current curve is selected, and the interpolated values are calculated on the basis of selected voltage (the current being dependent thereof).

In some embodiments, linear interpolation can be used. However, other types of interpolation can be used in embodiments of the present invention, e.g. in case of using several voltage settings for a specific voltage/current curve. It is noted that, if interpolation is performed during application of the X-rays, a small amount of normalization values need to be stored, thus reducing the size of the data storage 207. However, interpolation can be also performed during calibration, thus reducing runtime calculations at the expense of larger size of data storage 207.

The at least one normalized value can be used to correct or compensate 103 the width of the pulse (e.g. of the CRTL-X pulse), before the pulse is provided to the X-ray source. Thus, during application, the X-ray settings (e.g. the pulse width) can be updated before the voltage pulse is provided using the stored normalized value for the predetermined temperature, by applying 104 the compensated setting (e.g. the pulse width correction at that temperature for the selected voltage and current setting in order to actually achieve the expected pulse width) to the source. The update can be done with a programmed control unit 208, for example internal to the X-ray generator, or external. The unit 208 may include the data storage 207; however, the update can be done also with an algorithm including instructions to control and adapt the parameters, for example in the X-ray generator including the data storage 207.

To properly account for the influence of the temperature on the electronic characteristics of the tank, particularly on the electric characteristics of the high voltage capacitor and/or of the smoothing capacitor, the following information can be used:

- the expected variation of one or more electric characteristics of the circuitry in the tank with the temperature, and
- the temperature of the electronic circuitry.

This temperature can be controlled by a heating and/or cooling sub-system 210 (shown in FIG. 2) which control the temperature of the circuitry 204, 205 (e.g. of its environment, for example of a fluid 206 in contact with the circuitry, such as transformer oil), so the actual temperature is the predetermined temperature at which the value related to the pulse width is normalized. In this case, the value can be used as the normalized value to directly correct or compensate 103 the settings (e.g. the width) of the pulse before applying the pulse. The normalized value may be, for example, the difference between the actual and measured pulse width obtained by calibration and normalized to the predetermined temperature, so it can be directly applied to the pulse width settings when the X-ray tank is set at the predetermined temperature, and no calculation is necessary to obtain the normalized value.

Alternatively or additionally, the temperature of the electric circuitry can be measured 105. For example, a temperature sensor 209 (shown in FIG. 2) can measure 105 the temperature of the X-ray tank before the pulse is applied, so the electric characteristics can be taken into account when compensating 104 the settings. The temperature of the tank can be measured 105 by measuring the environmental temperature surrounding the high voltage converter 204 and/or the high voltage (HV) and smoothing capacitor or capacitors 205 in the tank, for example measuring the temperature of the surrounding fluid 206 (e.g. transformer oil).

In the embodiments where the temperature is measured, the expected variation of the electric characteristics (taking into account capacitors of the power supply, cabling, etc.) and the temperature is known, so a correction factor of electric characteristics (e.g. impedance, capacitance) can be used to take into account the rise and fall times, caused by the circuitry, taking into account that the circuitry behaves differently when temperature changes.

It should be underlined that the relationship between the electric characteristics and temperature can be used for normalization during calibration, as it will be seen in the second aspect, and also during application with temperature measurement, for effectively converting the pulse width correction from normalized to actual temperature.

Figure 4:
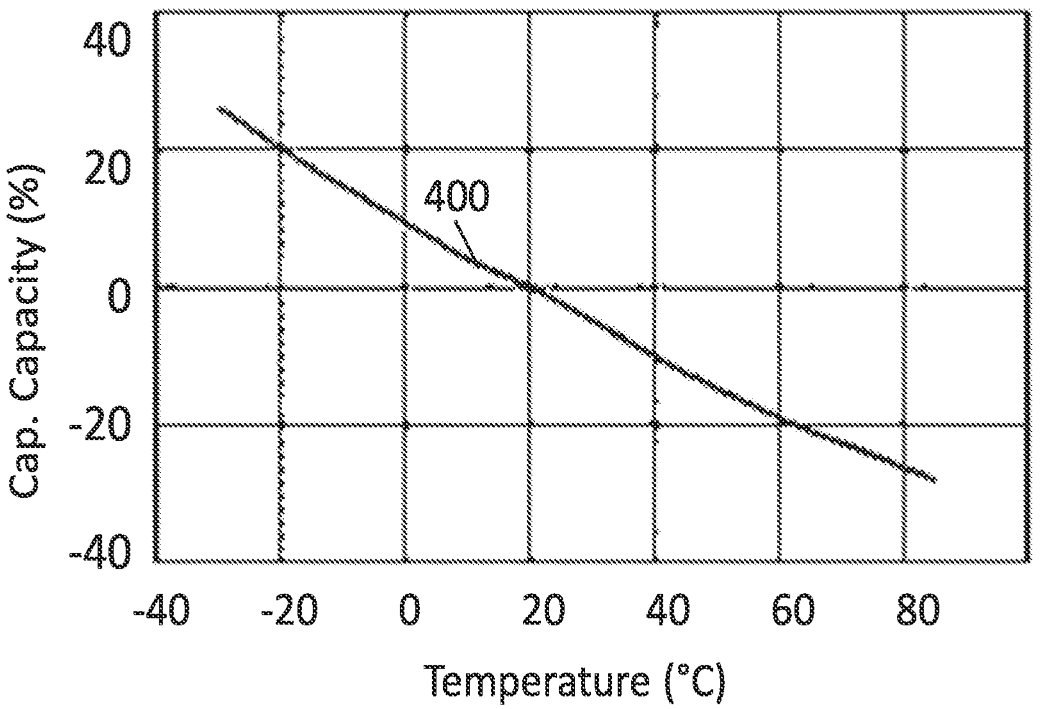
FIG. 4 shows a graph of an exemplary relation between capacitance change of an X-ray system and its environmental temperature

FIG. 4 shows a graph of an exemplary relationship 400 between capacitance variation of an X-ray tank, measured in percentage change (thus, the capacitance correction factor), and the environmental temperature, in Celsius. Providing this relationship can be done theoretically or empirically. In other words, the dependence of the electric characteristics with temperature can be known from the specifications of the manufacturer of the parts of the electric circuitry, it can be obtained from the type of capacitors and elements in the X-ray generator, from a datasheet, etc.; or it can be measured; or both, for fine tuning. During application, the capacitance variation is obtained in relationship with the temperature of the circuitry (e.g. the tank), "de-normalizing" the value related to the pulse width, from which the pulse width can be compensated 103.

Finally, the compensated settings can be applied 104 to the source, thereby obtaining an X-ray pulse (e.g. a train of X-ray pulsed, thus providing pulsed X-ray generation) with a corrected pulse width which corresponds more closely to the intended width than the effective pulse width that would be obtained if the settings would be simply used. For example, the corrected pulse width may match the intended width.

Additionally, the fall time can be updated by measuring the temperature runtime and updating the normalized values, which may vary after long periods of time due to deterioration of the X-ray source and/or the X-ray tank. This reduces the need of recalibration and the need of a service engineer. The method would be analogous to the one described, without the introduction of the defined voltage and current settings.

In a second aspect, the present invention provides a method of calibration based on a predictive model, for compensation of the rise and fall time of the pulse rise and fall edges 21, 22 (shown in FIG. 1). The method comprises providing at least one pulse (e.g. a train thereof) with predetermined current and voltage settings for obtaining a pulse with an intended width, measuring the actual pulse width, obtaining the value of the difference between the intended and actual pulse width and normalizing the value at a predetermined temperature. The normalization can be done by setting the temperature of the circuitry at a known value (e.g. the predetermined value of normalization) or by measuring said temperature, e.g. with a sensor, and then normalizing the value at a predetermined temperature. From the temperature and the width difference, the influence of the temperature on the rise and fall times caused by the circuitry can be taken into account. The normalized values obtained from the measurements are stored in the data storage 207, e.g. in a LUT. This can be repeated for several values of voltage, of current, or combinations of voltage and current, thus obtaining normalized values corresponding to different settings of current and voltage. In principle, these settings are valid for a wide range of pulse widths.

Figure 5:
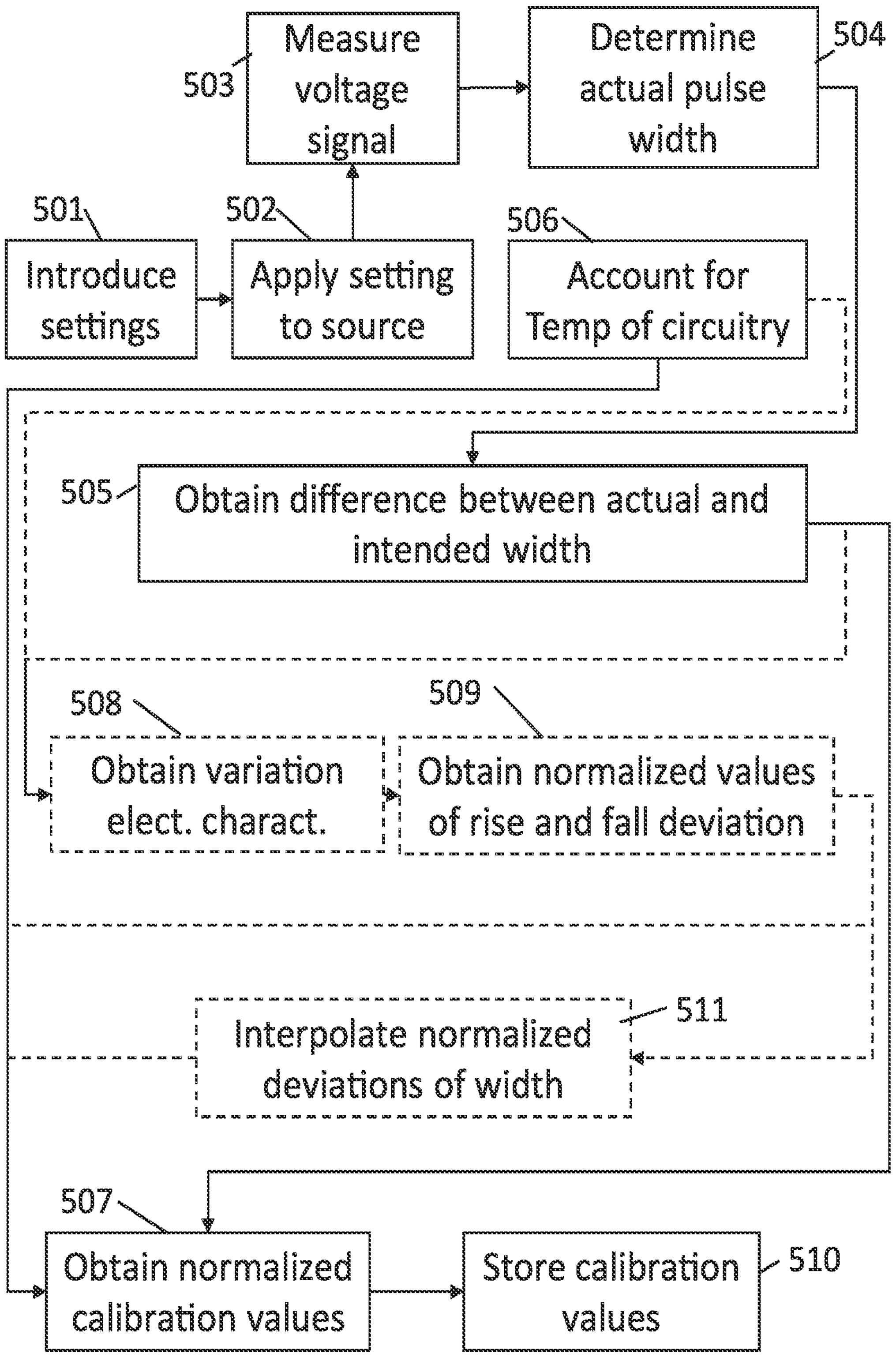
FIG. 5 illustrates a method of calibration in accordance with embodiments of the present invention, including optional steps in dashed lines.

FIG. 5 shows an example of such calibration procedure. First, the settings are chosen and introduced 501 in the X-ray system (e.g. via a user interface or database, for example in the X-ray generator 202), for providing a pulse with a predefined shape CTRL-X, in particular with a predetermined intended pulse width $T_{IW}$. These settings may include voltage, current and intended pulse width.

The settings are applied 502 to the source 203, which is activated and at least a pulse is provided. Subsequently, the actual voltage signal applied to the X-ray source is measured 503. The measurement can be done with a sub-system for measuring voltage, e.g. an electronic circuit in the control unit 208, or e.g. in the X-ray generator 202, etc.

Based on this measurement, the actual pulse width is determined 504. The actual pulse width can be determined 504 as the time interval between the moment at which the actual voltage signal surpasses a predetermined threshold and the moment at which the actual voltage signal drops under that predetermined threshold.

In other words, the effective width of the actual X-ray pulse ("actual pulse width") can be determined 504 taking into account the rise time $T_{RISE}$ and fall time $T_{FALL}$ of the voltage signal, thus the time interval between the moment at which the voltage surpasses a predetermined threshold (by convention, 75% of the voltage fixed in the settings) and the moment at which the voltage drops under that predetermined threshold.

The difference between intended pulse width ($T_{IW}$) and actual pulse width ($T_{effPW}$) is then obtained 505.

Further, the temperature of the circuitry is accounted 506 for. This may be done by obtaining the temperature of the circuitry which may comprise setting the temperature to a predetermined value before applying 502 the settings to the source, or it may comprise measuring the temperature of the circuitry while applying 502 the settings to the source and generating the pulses.

Setting the temperature may comprise heating or cooling the temperature of the circuits, using heaters or coolers, for example of the fluid surrounding the electronics, e.g. the oil in the tank, as explainer earlier. Measuring the temperature may comprise, also explained earlier, measuring the environmental temperature of the electronics, e.g. of the converter, e.g. of the HV and smoothing capacitor or capacitors, for example by sensing the temperature of the fluid of the tank, for example with a temperature sensor 209 including a sensing probe.

Then, the difference between the actual and intended width can be normalized 507 to a predetermined temperature, for example the temperature of the circuitry set by the user, or a temperature typically found in transformers, for example room temperature, e.g. between 20° C. and 40° C., for example 25° C.

Not only the rise and fall times can be compensated, but also the influence of changes of electric characteristics with temperature in the rise and fall edges. In particular, the rise and fall times depend on electric characteristics (such as impedance, e.g. the capacity) of the specific circuitry of the X-ray tank, including transformers, capacitors, cabling, which in turn depend on the temperature. Hence, the variation of the electric characteristics such as impedance can be obtained 508 by measurements, or from specification of the fabricant of the circuitry, as explained earlier. The normalized value can be then obtained 509 from the measurement of the actual pulse width and of the intended pulse width, measured for predetermined settings of current and voltage, taking into account the temperature of the X-ray tank and the previously obtained 508 variation of the electric characteristics.

For example, the variation of the capacitance of the HV and smoothing capacitors with temperature can be obtained 508 or known, as shown in FIG. 4. The rise and fall time variations with the temperature are obtained 509 from the variation of the capacitance with the temperature, in percentage. The measured temperature shows in the curve 400 the variation of the nominal capacitance. The normalized value is obtained by calculating this variation for a predetermined temperature.

The obtained normalized value is stored 510, for example in a data storage 207, together with the current and voltage setting at which that normalized value was obtained.

The cycle can be repeated for several settings. In general, the current setting and the voltage setting can be chosen differently, for example for different settings (high and low current, for instance).

For example, normalized values can be provided for few voltage settings, linked to predetermined values of current settings, and the same cycle can be repeated for the same few voltage settings, linked to predetermined but different current settings. This means that calibration can be provided for only few voltage and current settings, so values of voltage or current settings not chosen for calibration do not have a normalized value assigned to them.

In some embodiments of the present invention, those normalized values corresponding to values of voltage or current settings not chosen for calibration can still be interpolated 511 from the normalized values of chosen settings, in analogous way as in the interpolation performed with reference to embodiments of the first aspect, for example interpolating the normalized values from values obtained with values of the voltage which are higher, respective lower, than the non-chosen setting, but closest thereto. When this interpolation is performed during calibration, a larger data storage 207 is needed, but processing time is saved during utilization of the X-ray system.

However, interpolation can be done during calibration and also, if required, during runtime, if the chosen settings are not between the ones used to obtain the normalized values or the normalized values interpolated during calibration.

In the following, exemplary procedural steps for calibration and for subsequent application flow are provided:

Exemplary Steps for Calibration:

- Obtaining voltage, current and intended pulse width settings
- Emitting the pulse
- Measuring the actual (effective) width of the pulse
- Measuring the environmental temperature of the internal electrical circuitry of the tank
- Comparing deviation between effective and intended pulse width by:
  - Calculating expected variation of capacitance of capacitor in high voltage converter from the measured temperature, and obtaining the rise time and fall time deviation values of the pulse for a defined temperature using the actual capacitance (normalization)
  - Storing the rise time and fall time deviation values and the temperature in a LUT for the selected voltage and current settings.

Exemplary steps for application flow:

- Introducing voltage and current settings and the width for an intended pulse width, taking into account the normalized compensation
- Measuring temperature
- From the temperature, obtaining the expected variation of capacitance compared to the capacitance at the predetermined temperature
- From the voltage and current settings and said expected variation of capacitance, obtaining the required compensation for the rise and fall times that can be expected
- Applying the voltage and current settings and width (including de-normalized compensation) for emitting the corrected pulse The following Table I show exemplary values of the settings and obtained normalized values for several calibration settings, in a particular calibration method where the temperature of the tank is measured. The voltage, current and intended pulse width, as well as the predetermined temperature Tp are values set by the user, while the effective pulse width and temperature are measured, then the difference between the pulse widths (Delta) and normalized values NV are calculated.

TABLE I

Calibration file.

| Curve | Voltage kV | Current mA | $T_{IW}$ (ms) | $T_{EFFPW}$ (ms) | Delta D | T | Pred Temp. Tp | Normalized value NV |
|---|---|---|---|---|---|---|---|---|
| A | 40 | 1 | 10 | 15 | −5 | 40 | 25 | −5, 4 |
| A | 80 | 5 | 10 | 12 | −2 | 40 | 25 | −2, 2 |
| A | 120 | 10 | 10 | 8 | 2 | 40 | 25 | 2, 2 |
| B | 40 | 2 | 10 | 11 | −1 | 25 | 25 | −1, 0 |
| B | 80 | 10 | 10 | 10 | 0 | 20 | 25 | 0, 0 |
| B | 120 | 20 | 10 | 8 | 2 | 25 | 25 | 2, 0 |

For the Table I, two curves (A and B) with different current settings are used. For each, the intended pulse width is 10 ms, but the effective width of the actual pulse (obtained from the measured actual voltage) is different for each setting. The difference (Delta) is obtained from the difference between the intended pulse width and the effective pulse width:

$$\text{Delta } D = T_{IW} - T_{EFFPW}$$

The temperature is measured for each setting, and the normalized value of the Delta is obtained from the delta by normalizing to Tp=25° C., using the relationship of FIG. 4:

$$\text{Normalized value } NV = D(1+(0.005(T-Tp))$$

In this case, the relationship is linear, but in other cases different factors for calculating NV can be used, depending on the circuitry components.

The following Table II shows an exemplary correction of the pulse width, shown in the column "CTRL-X programmed APW", using the normalized values of Table I, for each of the curves A and B. It is noted that each voltage setting is linked to a value of current setting in curve A and a different value of current setting in curve B. In case of Table II, the number of voltage settings chosen is larger than the voltage settings used for calibration, so interpolation is used to obtain the intermediate values (interpolated NV).

In this case, linear interpolation is used. The temperature is also measured (Tm), the predetermined temperature Tp of the normalized values being the same as in the calibration. The linear interpolation is done on the basis of the values of the voltage settings, but a different linear interpolation is done for each current setting (each curve A, B). The difference in linear interpolation between the curves is dependent on the difference in current (or curve shape). The measured temperature Tm results in a percentage variation. The intended pulse width has been chosen as different for each setting of the curve A and each setting of the curve B.

TABLE II

Correction based on stored normalized values.

| Curve | Chosen voltage V (kV) | mA | IntNV | Tm | Tp | Delta correction Dc | $T_{IW}$ (ms) | CTRL-X programmed APW |
|---|---|---|---|---|---|---|---|---|
| A | 41 | 1 | −5, 3 | 40 | 25 | −4, 9 | 10 | 5, 1 |
| A | 42 | 1, 1 | −5, 2 | 40 | 25 | −4, 8 | 11 | 6, 2 |
| A | 43 | 1, 2 | −5, 1 | 40 | 25 | −4, 7 | 12 | 7, 3 |
| A | 44 | 1, 3 | −5, 1 | 40 | 25 | −4, 7 | 13 | 8, 3 |
| A | 45 | 1, 4 | −5, 0 | 40 | 25 | −4, 6 | 14 | 9, 4 |
| A | 46 | 1, 5 | −4, 9 | 40 | 25 | −4, 5 | 15 | 10, 5 |
| A | 47 | 1, 6 | −4, 8 | 40 | 25 | −4, 4 | 16 | 11, 6 |
| A | 48 | 1, 7 | −4, 7 | 40 | 25 | −4, 4 | 17 | 12, 6 |
| A | 49 | 1, 8 | −4, 6 | 40 | 25 | −4, 3 | 18 | 13, 7 |
| A | 50 | 1, 9 | −4, 6 | 40 | 25 | −4, 2 | 19 | 14, 8 |
| B | 41 | 2 | −1, 0 | 20 | 25 | −1, 0 | 10 | 9, 0 |
| B | 42 | 2, 2 | −1, 0 | 50 | 25 | −0, 8 | 11 | 10, 2 |
| B | 43 | 2, 4 | −0, 9 | 40 | 25 | −0, 9 | 12 | 11, 1 |
| B | 44 | 2, 6 | −0, 9 | 40 | 25 | −0, 8 | 13 | 12, 2 |
| B | 45 | 2, 8 | −0, 9 | 40 | 25 | −0, 8 | 14 | 13, 2 |
| B | 46 | 3 | −0, 9 | 40 | 25 | −0, 8 | 15 | 14, 2 |
| B | 47 | 3, 2 | −0, 8 | 40 | 25 | −0, 8 | 16 | 15, 2 |
| B | 48 | 3, 4 | −0, 8 | 40 | 25 | −0, 7 | 17 | 16, 3 |
| B | 49 | 3, 6 | −0, 8 | 40 | 25 | −0, 7 | 18 | 17, 3 |
| B | 50 | 3, 8 | −0, 8 | 40 | 25 | −0, 7 | 19 | 18, 3 |

The chosen voltage V ranges between 41 and 50. Thus, the interpolated normalized values are interpolated from the normalized values obtained for the settings of 40 kV and 80 kV, for each curve (each different mA setting), being −5.4 and −2.2 for the curve A and −1 and 0 for the curve B, respectively (see Table I).

The linear interpolation is in each case:

$$\text{Interpolated } NV\ \text{IntNV}=-5.4+(V-40\ \text{kV})(-2.2-(-5.4))/(80\ \text{kV}-40\ \text{kV}),\ \text{for curve } A$$

$$\text{Interpolated } NV\ \text{IntNV}=-1.0+(V-40\ \text{kV})/(80\ \text{kV}-40\ \text{kV}),\ \text{for curve } B$$

In case of curve A, the actual temperature of the circuitry (e.g. the tank) is constant, and equal to 40° C. In case of curve B, the measurement of the temperature of the circuitry presents variation. The predetermined temperature Tp for the normalization (25° C., in this case) is used again to obtain the actual Delta correction Dc that should be applied:

$$Dc=\text{IntNV}\ (1-(0.005(Tm-Tp))$$

Finally, the delta correction is used to obtain the actual pulse width (APW) that the user needs to program, for an intended pulse width $T_{IW}$:

$$\text{CTRL-}X\text{ programed } APW=T_{IW}+Dc$$

Thus, it is clear that the calibration method of the second aspect can be used to provide the normalized values used in the method of providing X-ray pulses of the first aspect of the present invention.

In a third aspect, the present invention provides a software product, e.g. a computer program product, or a data carrier including such program, such that when linked to an X-ray system, it allows providing X-ray pulses in accordance with the method of the first aspect of the present invention.

The software product may be adapted for receiving a required pulse width setting, further adapted for receiving normalized values obtained by the calibration method of the second aspect of the present invention.

An X-ray system including such software product (e.g. in a control unit 208, or in the X-ray generator 202) can improve the performance of the system, enabling the use of pulses with small width, thus increasing the usable range. The control unit also allows X-ray generation with lower power, which in turn increases the useful life of X-ray sources. Moreover, because the difference between intended pulse and the pulse obtained is reduced, for the same settings of the voltage and current, international regulatory requirements of accuracy can be more easily met. This also helps in increasing the usable range of pulse widths in the lower range, e.g. providing small width (very short pulses) accurately.

In a fourth aspect of the present invention, a software product is provided for calibrating an X-ray system. The software product may be adapted for receiving pulse width measurements, it may optionally be adapted for receiving temperature measurements, and it may include instructions for executing the calibration method of embodiments of the second aspect of the present invention, when implemented in an X-ray system. Such software product can build a prediction model for compensating deviations of the pulse width including the temperature variations of the tank, thus providing a compensated pulse width X-ray system when the software is implemented in an X-ray system.

A software product in accordance with embodiments of the present invention may include the third and fourth aspects of the present invention, thus allowing calibrating an X-ray system and providing pulsed X-rays with corrected pulse widths obtained during calibration.

In a fifth aspect, the present invention provides a data storage comprising the normalized values obtained by the method of the second aspect of the present invention. Such data storage may be linked to a control unit, for example one unit including a software product in accordance with embodiments of the third and/or fourth aspect of the present invention. In some embodiments, the data storage is implemented in software. For example, it may be implemented as part of the software product of the third and/or fourth aspect of the present invention.

Such data storage may be reprogrammable, and updated normalized values can be included, for example by interpolation or by the method of calibration in accordance with embodiments of the second aspect of the present invention.

In a sixth aspect, the present invention provides an X-ray system adapted for generating pulses with an effective width, compensated for different values of the voltage or current setting and independent of the temperature, in accordance with embodiments of the first aspect, and/or for performing the calibration described with reference to embodiments of the second aspect. For example, the X-ray system may include a software product or program product in accordance with embodiments of the third and/or fourth aspects of the present invention.

The voltage provided by the X-ray system may range between 35 kV and 150 kV, for example between 40 kV and 120 kV. Traditional X-ray systems have an optimal setting where the settings coincide fairly well with the effective pulse, typically between 70 kV and 80 kV for example. For higher and lower kV settings the deviations between intended and effective pulse width increase. The present invention provides an effective correction of the pulse width for a wider range of voltage and current settings, even for low values of current and/or voltage, which allows optimization of the dosage, reduction of the wasted power. Because the pulse width is more accurate, the average current can be obtained with higher accuracy, in compliance with regulations of current and voltage accuracy, and in turn enabling smaller pulse widths.

Going back to FIG. 2, a schematic embodiment of such X-ray system 200 is shown, including an X-ray generator 202 and X-ray source 203 which is included in a tank 201. In the particular example of the figure, the X-ray system 200 includes a high voltage converter 204 and a HV and smoothing capacitor 205, surrounded by fluid 206. For example, at least the converter 204 and the smoothing capacitor 205 may be surrounded by oil, e.g. transformer oil, for example in a tank 201, which may also include the source 203. A control unit 208, which may include a software program in accordance with embodiments of the third aspect of the present invention, is included. The control unit 208 may be external as shown in the figure, or internal, for instance being an integral part of the X-ray generator 202. A data storage 207 may include normalized values for adjusting the pulse width in accordance with embodiments of the first aspect. The data storage 207 may be optionally part of the control unit 208. The data storage may be reprogrammable, for providing additional normalized values, either by measuring them from actual pulses or by interpolating them from known values.

The X-ray system may be adapted to take into account the temperature of the circuitry, or part thereof, which is used to provide the pulses, e.g. the high voltage converter, and/or the HV and smoothing capacitor. In some embodiments, the temperature can be measured by a temperature sensor 209, which include any sensor that measures a parameter which is a function of temperature. For example, a temperature sensor may include an element that measures changes in the resistance of a conductor due to changes of temperature. In some embodiments of the present invention, the environmental temperature of the circuitry in the tank is measured. For example, the temperature of the HV and smoothing capacitor 205 can be measured. For example, the temperature of the environment surrounding the circuitry of the high voltage converter 204, or both the converter 204 and the smoothing capacitor 205, can be measured, optionally including wiring, etc. In some embodiments, the environment surrounding at least part of the circuitry is fluid 206, for example oil (e.g. transformer oil, usually present for cooling, but the present invention is not limited to cooling functions). The temperature of the fluid is an important indicator for the environmental temperature, especially where this fluid 206 surrounds the HV and smoothing capacitors 205, as these capacitors plays a major role in the shape of the voltage pulse and its edges 21, 22. Thus, in embodiments of the present invention, the fluid temperature is measured, e.g. using one or more NTC thermistors, thermocouples or the like, for example in the immediate surroundings of the smoothing capacitor.

In some embodiments, the fluid can be circulated in order to provide evenly distributed temperature in the tank. For example, an oil pump could be included. Cooling may be implemented e.g. as passive cooling.

In alternative embodiments, in order to take into account the temperature of the circuitry, the system 200 includes a heating and/or a cooling temperature sub-system 210, for example heaters, and/or heat extractors, for setting the temperature of the fluid 206. In this case, the temperature sensor 209 can still be optionally present. The sub-system 210 may be actuated by the X-ray system, e.g. by the control unit 208 thereof, for example during calibration and/or during utilization of the X-ray system.

The X-ray system may include a sub-system 211 for measuring the effective width of the actual pulse provided during calibration. The sub-system 211 may comprise electronic circuitry in the control unit 208, and/or in the X-ray generator, for example. The actual voltage level in the X-ray tank can be measured, and the measurements can be processed (e.g. in a system controller, control unit, etc.) in order to determine signal level.

The X-ray system 200 may be included in a monoblock, integrating at least the tank 201, optionally also the X-ray generator 202 in a single block, which can be part of a CR unit, mammography unit, part of a mobile x-ray equipment, for example for mobile surgery applications, the present invention not being limited to these applications.

Figure 6:
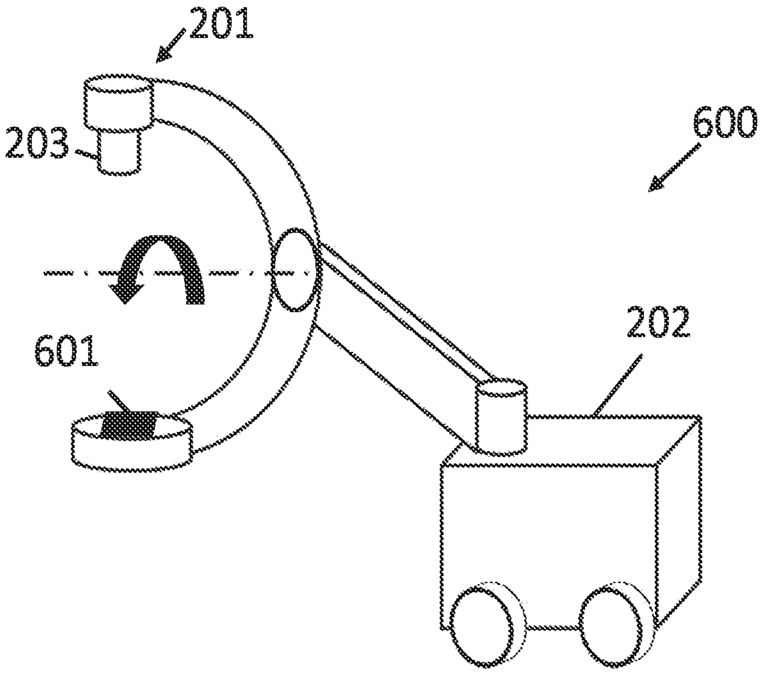
FIG. 6 schematically shows an X-ray system in accordance with some embodiments of the present invention.

FIG. 6 shows an assembly 600, which may be fixed or moveable, including an X-ray tank 201 comprising a source 203, and detector 601 arranged distantly from the source 203, for example in rotatable tomography setup. An X-ray generator 202 is included, for instance including data storage and executable instructions for carrying out the methods of the first and second aspects of the present invention.

The invention claimed is:

1. A method of providing X-ray pulses, the method comprising:

selecting a setting for each of voltage, current, and intended pulse width for providing the X-ray pulses by an X-ray system;

compensating the intended pulse width setting for the voltage setting and the current setting based on internal temperature of an X-ray tank of the X-ray system and a normalized value related to the pulse width, wherein the normalized value is determined based on a deviation between (i) an intended pulse width for an applied current and an applied voltage and (ii) an actual pulse width measured for the applied current and the applied voltage at a predetermined temperature of the X-ray system; and applying the compensated pulse width setting to provide the X-ray pulses.

2. The method of claim 1, further comprising:

accessing a stored first normalized value corresponding to a first setting for current and a first setting for voltage;

accessing a stored second normalized value corresponding to a second setting for current and a second setting for voltage; and calculating, by interpolation, the normalized value from the stored first normalized value and the stored second normalized value, wherein at least one of:

(i) the first setting for current is different from the second setting for current and the selected current setting is between the first setting current and the second setting for current, or (ii) the first setting for voltage is different from the second setting for voltage and the selected voltage setting is between the first setting for voltage and the second setting for voltage.

3. The method of claim 1, further comprising:

measuring the internal temperature of the X-ray tank before compensating the intended pulse width setting.

4. The method of claim 1, wherein the X-ray tank comprises electronic circuitry and the internal temperature of the X-ray tank is an environmental temperature of the electronic circuitry.

5. The method of claim 1, wherein the stored normalized value is determined by:

applying a current, a voltage, and an intended pulse width for providing an X-ray pulse;

determining an actual voltage and an actual current generated and applied to an X-ray source of the X-ray system to provide the X-ray pulse having the actual pulse width;

measuring the internal temperature of the X-ray tank and the actual voltage;

determining the actual pulse width for providing the X-ray pulse based on the measured actual voltage;

obtaining a pulse width difference between the actual pulse width and the intended pulse width for the applied current and the applied voltage at a predetermined internal temperature of the X-ray tank;

determining the normalized value based on the pulse width difference, taking into account the measured internal temperature of the X-ray tank; and storing the normalized value as a function of the applied voltage and the applied current.

6. The method of claim 5, further comprising:

determining a rise and fall time deviation of the X-ray pulse based on the pulse width different;

determining a normalized value of the rise and fall time deviation at the predetermined internal temperature of the X-ray tank based on a predetermined relationship between capacitance variation of the X-ray tank and the measured internal temperature of the X-ray tank; and determining the normalized value based on the normalized value of the rise and fall time deviation.

7. The method of claim 5, wherein the method of the claim 5 is repeated with at least one different voltage or different current applied to determine and store at least one different normalized value as a function of the at least one different applied voltage or different applied current.

8. A system for providing X-ray pulses, the system comprising:

a processor configured to:

select a setting for each of voltage, current, and intended pulse width for providing the X-ray pulses by an X-ray system, compensate the intended pulse width setting for the voltage setting and the current setting based on internal temperature of an X-ray tank of the X-ray system and a normalized value related to the pulse width, wherein the normalized value is determined based on a deviation between (i) an intended pulse width for an applied current and an applied voltage and (ii) an actual pulse width measured for the applied current and the applied voltage at a predetermined temperature of the X-ray system, and apply the compensated pulse width setting to provide the X-ray pulses.

9. The system of claim 8, further comprising the X-ray system comprising the X-ray tank and an X-ray source.

10. The system of claim 8, wherein the X-ray tank comprises electronic circuitry and the internal temperature of the X-ray tank is an environmental temperature of the electronic circuitry.

11. The system of claim 8, further comprising a temperature sensor configured to measure the internal temperature of the X-ray tank before compensating the intended pulse width setting.

12. The system of claim 8, wherein the processor is further configured to:

access a stored first normalized value corresponding to a first setting for current and a first setting for voltage, access a stored second normalized value corresponding to a second setting for current and a second setting for voltage, and calculate, by interpolation, the normalized value from the stored first normalized value and the stored second normalized value;

wherein at least one of:

(i) the first setting for current is different from the second setting for current and the selected current setting is between the first setting current and the second setting for current, or (ii) the first setting for voltage is different from the second setting for voltage and the selected voltage setting is between the first setting for voltage and the second setting for voltage.

13. The system of claim 8, wherein the processor is further configured to determine the normalized value by a process comprising to:

apply a current, a voltage, and an intended pulse width for providing an X-ray pulse, determine an actual voltage and an actual current generated and applied to an X-ray source of the X-ray system to provide the X-ray pulse having the actual pulse width, measure the internal temperature of the X-ray tank and the actual voltage, determine the actual pulse width for providing the X-ray pulse based on the measured actual voltage, obtain a pulse width difference between the actual pulse width and the intended pulse width for the applied current and the applied voltage at a predetermined internal temperature of the X-ray tank, determine the normalized value based on the pulse width difference, taking into account the measured internal temperature of the X-ray tank, and store the normalized value as a function of the applied voltage and the applied current.

14. The system of claim 13, wherein the processor is further configured to determine a rise and fall time deviation of the X-ray pulse based on the pulse width different, determine a normalized value of the rise and fall time deviation at the predetermined internal temperature of the X-ray tank based on a predetermined relationship between capacitance variation of the X-ray tank and the measured internal temperature of the X-ray tank, and determine the normalized value based on the normalized value of the rise and fall time deviation.

15. The system of claim 13, wherein the processor is further configured to repeat the process with at least one different voltage or different current applied to determine and store at least one different normalized value as a function of the at least one different applied voltage or different applied current.

16. A non-transitory computer-readable storage medium having stored a computer program comprising instructions, which, when executed by a processor, cause the processor to:

select a setting for each of voltage, current, and intended pulse width for providing the X -ray pulses by an X-ray system;

compensate the intended pulse width setting for the voltage setting and the current setting based on internal temperature of an X-ray tank of the X-ray system and a normalized value related to the pulse width, wherein the normalized value is determined based on a deviation between (i) an intended pulse width setting for an applied current and an applied voltage and (ii) an actual pulse width measured for the applied current and the applied voltage at a predetermined temperature of the X-ray system; and apply the compensated pulse width setting to provide the X-ray pulses.

17. The non-transitory computer-readable storage medium of claim 16, wherein the instruction, when executed by the processor, further cause the processor to:

access a stored first normalized value corresponding to a first setting for current and a first setting for voltage;

access a stored second normalized value corresponding to a second setting for current and a second setting for voltage; and calculate, by interpolation, the normalized value from the stored first normalized value and the stored second normalized value, wherein at least one of:

(i) the first setting for current is different from the second setting for current and the selected current setting is between the first setting current and the second setting for current, or (ii) the first setting for voltage is different from the second setting for voltage and the selected voltage setting is between the first setting for voltage and the second setting for voltage.

18. The non-transitory computer-readable storage medium of claim 16, wherein the instruction, when executed by the processor, further cause the processor to determine the normalized value by a process comprising to:

apply a current, a voltage, and an intended pulse width for providing an X-ray pulse, determine an actual voltage and an actual current generated and applied to an X-ray source of the X-ray system to provide the X-ray pulse having the actual pulse width, measure the internal temperature of the X-ray tank and the actual voltage, determine the actual pulse width for providing the X-ray pulse based on the measured actual voltage, obtain a pulse width difference between the actual pulse width and the intended pulse width for the applied current and the applied voltage at a predetermined internal temperature of the X-ray tank, determine the normalized value based on the pulse width difference, taking into account the measured internal temperature of the X-ray tank, and store the normalized value as a function of the applied voltage and the applied current.

19. The non-transitory computer-readable storage medium of claim 18, wherein the instruction, when executed by the processor, further cause the processor to:

determine a rise and fall time deviation of the X-ray pulse based on the pulse width different, determine a normalized value of the rise and fall time deviation at the predetermined internal temperature of the X-ray tank based on a predetermined relationship between capacitance variation of the X-ray tank and the measured internal temperature of the X-ray tank, and determine the normalized value based on the normalized value of the rise and fall time deviation.

20. The non-transitory computer-readable storage medium of claim 19, wherein the instruction, when executed by the processor, further cause the processor to repeat the process with at least one different voltage or different current applied to determine and store at least one different normalized value as a function of the at least one different applied voltage or different applied current.

* * * * *